United States Patent [19]

Foster et al.

[11] 3,981,479
[45] Sept. 21, 1976

[54] CHECK VALVE

[75] Inventors: Frank L. Foster, Corry; Wayne E. Wilcox, Union City, both of Pa.

[73] Assignee: Snap-Tite, Inc., Union City, Pa.

[22] Filed: June 14, 1974

[21] Appl. No.: 479,194

[52] U.S. Cl. ............................... 251/63.6; 91/420;
137/522; 137/596.2
[51] Int. Cl.² ....................................... F16K 31/163
[58] Field of Search ............... 137/543, 543.13, 542,
137/596.1, 596.2, 596.13, 596.14, 522,
630.15; 251/25, 62, 63.6, 51, 52; 91/420,461

[56] References Cited
UNITED STATES PATENTS

| | | | |
|---|---|---|---|
| 761,651 | 6/1904 | Bingley | 137/596.2 |
| 1,435,105 | 11/1922 | Clapp | 137/522 |
| 2,298,646 | 10/1942 | Ovens | 137/522 |
| 2,673,570 | 3/1954 | Cunningham et al. | 137/543.13 |
| 3,030,929 | 4/1962 | Hipp | 91/461 |
| 3,631,887 | 1/1972 | Fellbach et al. | 137/522 |
| 3,792,715 | 2/1974 | Parrett et al. | 137/596.2 |

FOREIGN PATENTS OR APPLICATIONS

| | | | |
|---|---|---|---|
| 1,188,022 | 4/1970 | United Kingdom | 137/522 |

*Primary Examiner*—Martin P. Schwadron
*Assistant Examiner*—G. Walton
*Attorney, Agent, or Firm*—Woodling, Krost, Granger and Rust

[57] ABSTRACT

A cartridge type check valve which may be either pilot operated or of the free flow type. The pilot operated type includes in combination a generally cylindrically-shaped housing having first and second end portions and having internal wall means defining an opening extending axially therethrough. A valve seat is formed on the internal wall means and a valve member is movable into and out of engagement with the valve seat to selectively prohibit and permit fluid flow through the axially extending opening at the valve seat. A fluid port is provided in the first end portion of the housing and serves to provide for fluid entrance into the axially extending opening. A control piston is positioned in the second end portion of the housing and is movable between first and second positions as is a valve stem, which is connected to the valve member and extends axially to a position adjacent the control piston and is adapted to be engaged and moved by the control piston. A valve guide is positioned in an intermediate portion of the housing and has a periphery located adjacent the internal wall means of the housing and this valve guide and the control piston define a fluid chamber therebetween. A stop shoulder is provided on the internal wall means and is engageable with the valve guide to limit movement of the valve guide in the direction of the valve seat. A central opening is provided in the valve guide which serves to slidably accommodate the valve stem and a fluid opening is provided in the valve guide for providing fluid communication between the fluid chamber and the axial opening at the first end portion of the housing. A spring member acts between the valve member and the valve guide tending to move the valve member into engagement with the valve seat and the valve guide into engagement with the stop shoulder. The free flow type also includes this structure with the exception of the control piston which is omitted and the fluid opening in the valve guide is enlarged. Another fluid port may be provided at the previous location of the control piston to provide for the entrance of additional fluid into the housing or it may completely replace the previously mentioned fluid port.

12 Claims, 7 Drawing Figures

CHECK VALVE

The present invention relates to a pilot operated check valve design. Check valves which are pilot operated have been built in the past, however, the present design disclosed herein provides a unique structure and result not heretofore known.

Prior art devices have located the pilot or control piston in a separate cavity in a manifold or other piece of equipment which requires the ultimate user to machine a cavity for the valve as well as a separate cylinder cavity for the control piston. The present invention obviates these difficulties in that the check valve and the piston are designed into the same single housing which requires that the ultimate user machine only one cavity to receive this single housing.

In addition, the present design discloses an improved mechanical linkage between the valve and the control piston, as well as an improved guide for the mechanical linkage. Additionally, there is provided a unique means for retaining the synthetic seal member of the check valve.

Other objects and a fuller understanding of this invention may be had by referring to the following description and claims, taken in conjunction with the accompanying drawings, in which:

Figure 1:
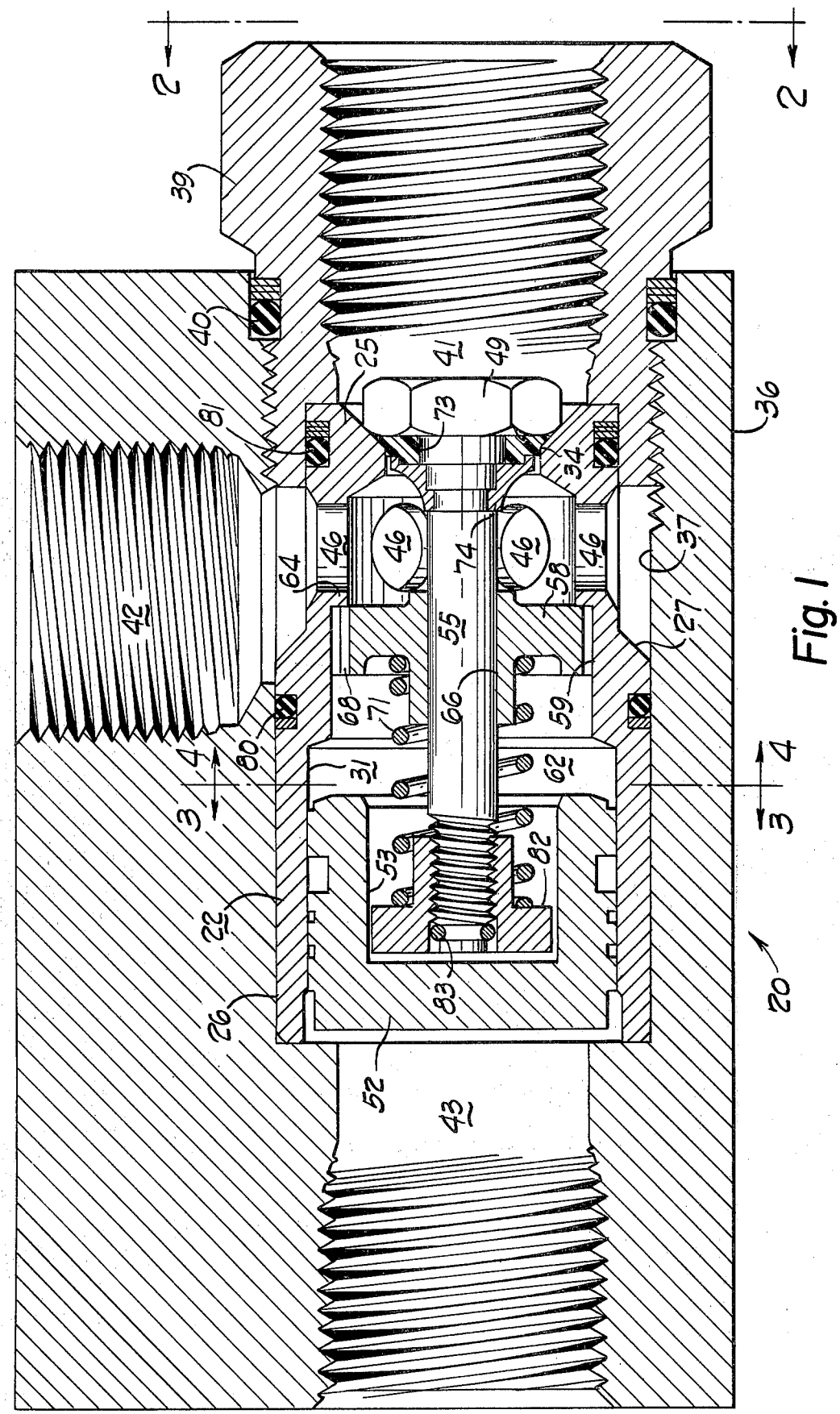
FIG. 1 is an elevational view in section of the pilot operated check valve of the present invention installed in the bore of a manifold body.
Figure 2:
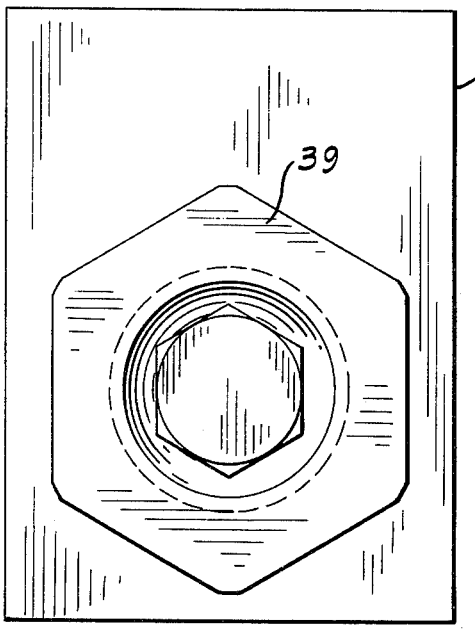
FIG. 2 is a view taken generally along the line 2-2 of FIG. 1 and on a reduced scale.
Figure 3:
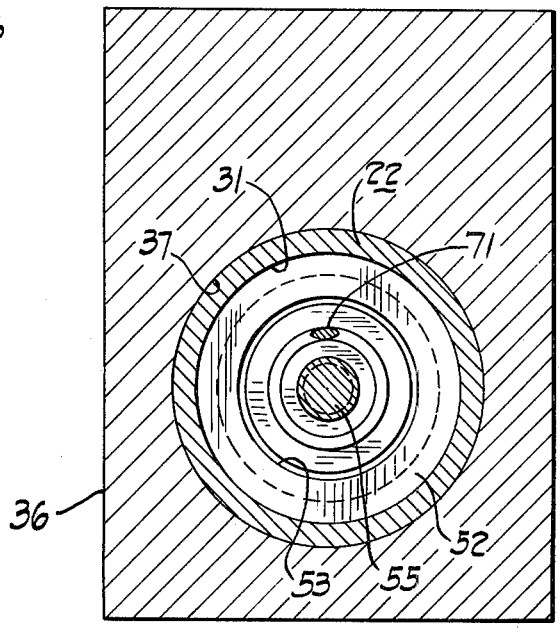
FIG. 3 is a view taken generally along the line 3-3 of FIG. 1 and on a reduced scale.
Figure 4:
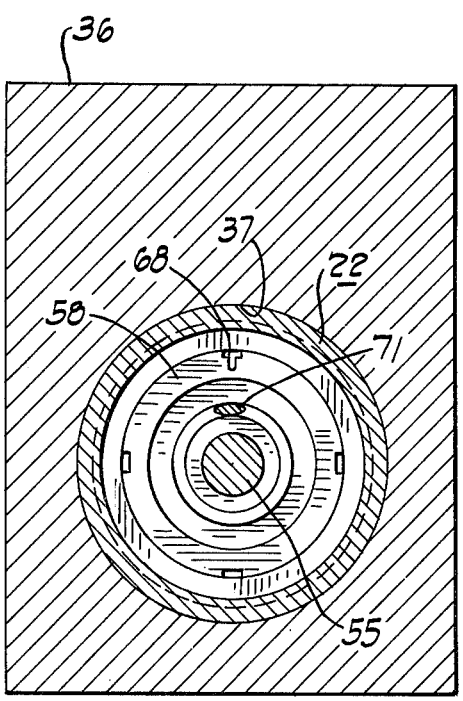
FIG. 4 is a view taken generally along the line 4-4 of FIG. 1 and on a reduced scale.
Figure 5:
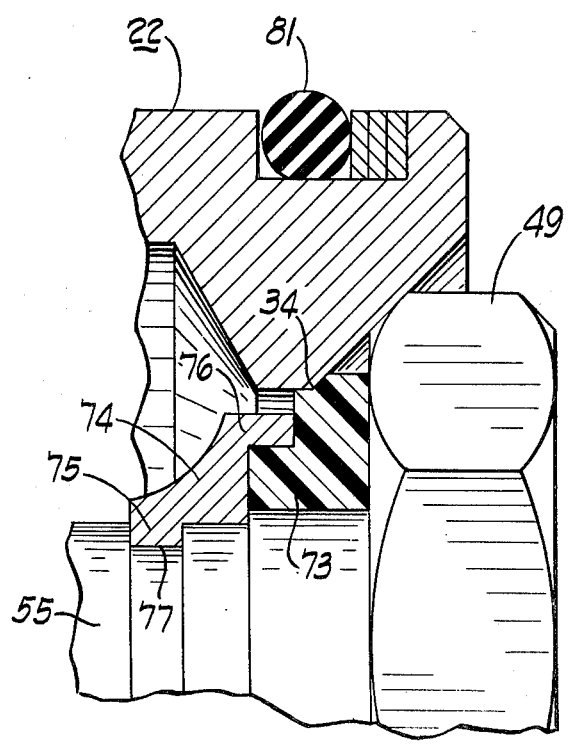
FIG. 5 is an enlarged fragmentary view of a portion of FIG. 1.
Figure 6:
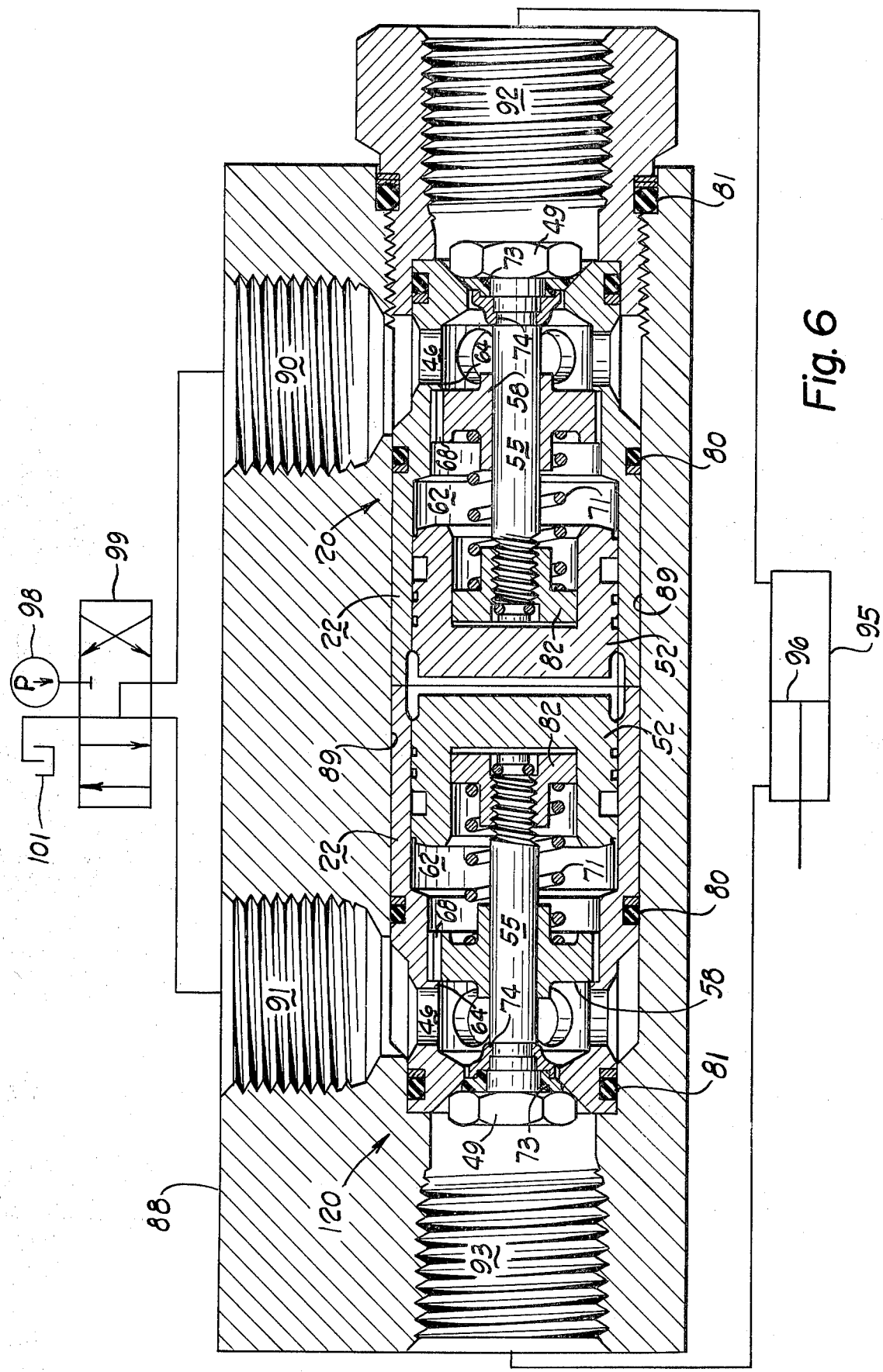
Figure 7:
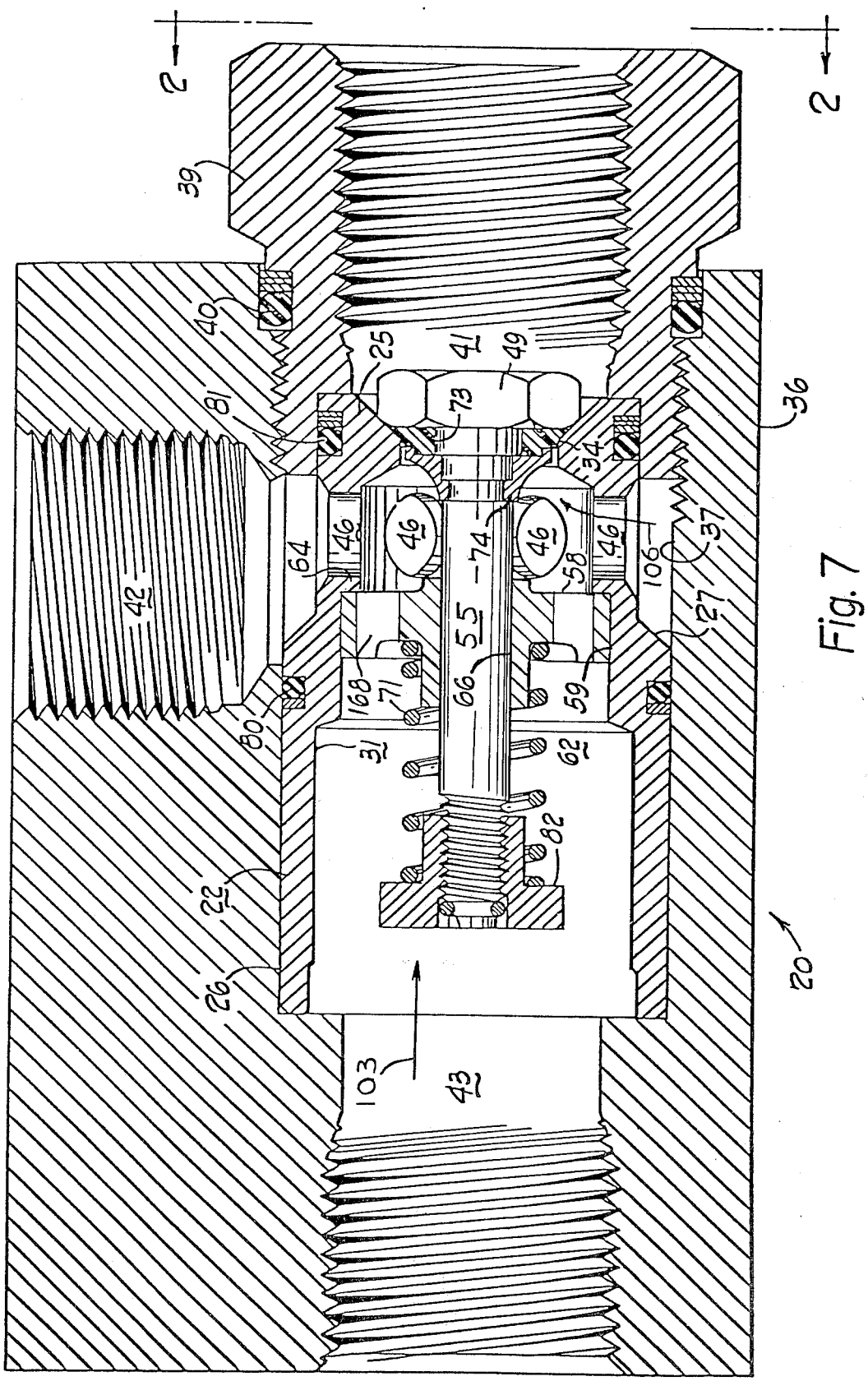

FIG. 6 is another illustration showing the invention described in FIGS. 1 through 5 and in this illustration two of the pilot operated check valves are shown in the bore of the manifold body and are illustrated as controlling the movement of a piston in a cylinder through a valve which directs a pressure source; and FIG. 7 is an elevational view similar to FIG. 1 showing the modifications necessary to convert the structure to a free flow type check valve.

Referring specifically to FIGS. 1 through 5, there is shown illustrated the pilot operated check valve of the present invention which has been indicated generally by the reference numeral 20. This check valve of the invention includes in combination a generally cylindrically-shaped housing 22 which has first and second end portions 25 and 26, respectively, and an intermediate portion 27 located therebetween. This pilot operated check valve 20 has been shown in FIG. 1 as being positioned in the bore 37 of a manifold body 36. The manifold body illustrated in FIG. 1 is provided with first, second and third ports identified respectively by the reference numerals 41, 42 and 43. The first end portion 25 sometimes referred to as the nose end portion of the housing 22 is engaged by a shoulder on a threaded adapter 39 which threaded adapter is screwed into the first port 41 and this adapter serves to fix the housing 22 in the bore 37. An O-ring 40 is located in an annular groove on the outer surface of the adapter 39 and serves to prevent fluid leakage along the interface between the port 41 and the adapter 39. The cylindrical housing 22 is provided with internal wall means 31, which serve to define an opening which extends completely axially through the housing and a portion of these wall means serve to define a valve seat 34 at the first end portion 25 of the housing. Fluid openings or ports 46 serve to provide fluid entrance to and from the opening 31 which extends through the housing.

A valve member 49 is positioned at the first end portion 25 of the housing and is movable into and out of engagement with the valve seat 34 or in other words it is movable between closed and open positions to selectively prohibit and permit fluid flow through the opening 31 past the valve seat 34. A control piston 52 is positioned in the second end portion 26 of the housing 22 and is movable between first and second positions. The internal wall means 31 which define the axially extending opening in the housing are machine finished in the area where the control piston 52 resides so the control piston can easily move back and forth between the first and second positions. The control piston 52 is provided with a counterbore 53. A valve stem 55 is integrally connected to the valve member 49 and extends axially through the housing opening to a position adjacent the control piston and located within the counterbore 53. The end of the valve stem 55 in the counterbore 53 includes a head member 82 which is threadably connected to the valve stem and the head 82 resides in the counterbore 53 in piston-like fashion. A snap-ring 83 insures that the head 82 will not become accidentially unthreaded from the end of the valve stem 55.

A valve guide 58 is positioned in the intermediate portion 27 of the housing and has a periphery or peripheral portion 59 located adjacent the internal wall means 31 of the housing. This valve guide 58 and the control piston 52 serve to define a fluid chamber 62 therebetween. A stop-shoulder 64 is provided on the internal wall means 31 and is engageable with the valve guide 58 to limit movement of the valve guide in the direction of the valve seat 34. The valve stem 55 slidably extends through a central opening 66 in the valve guide in order to traverse the distance between the valve member and the control piston. It will be observed that the valve guide 58 is capable of moving on the valve stem 55 and the valve stem is capable of moving relative to the valve guide. A fluid opening or passageway 68 is provided in the valve guide 58 and serves to provide for fluid communication between the fluid chamber 62 and port 46. A spring 71 acts between or engages the valve guide 58 at one end and engages the valve stem 55 by way of the head 82 at the other end. This spring always tends to move the valve member 49 closed or into engagement with the valve seat 34 and always urges the valve guide 58 toward engagement with the stop-shoulder 64.

Referring specifically to the enlarged view of FIG. 5, there is here illustrated the unique features of the sealing arrangement on the valve member 49. The sealing member 73 completely surrounds stem 55 and engages the valve member 49 which is in the form of an enlarged head portion. A generally cup-shaped retainer 74 has a smaller diameter portion 75 which resides in a groove 77 in the valve stem 55 and has a larger diameter portion 76 which surrounds or encompasses the sealing member 73 to hold the same in position. Sealing grooves are provided on the exterior of the cylindrical housing 22 and seals 80 and 81, respectively, reside in these grooves in order to provide a good seal at the exterior surface of the housing 22.

In operation, it will be observed that fluid flow is permitted freely in the direction from port 42 and 41 and the only force that need be overcome is the small force of spring 71. It will, also, be apparent to those skilled in the art that flow in the reverse direction, namely from port 41 to port 42 is prohibited until a signal pressure is provided at port 43. This pressure acts against the end of control piston 52 and movement of control piston 52 causes movement of valve stem 55 which opens valve member 49 and permits flow of fluid from port 41 to port 42. The functioning of the additional parts disclosed and described herein will be more completely understood after a detailed description of the structure and operation of the embodiment shown in FIG. 6.

FIG. 6 illustrates the teachings of the present invention as used in moving and locking a piston in a cylinder. In this particular embodiment there is shown a manifold body 88 which is provided with a bore 89 therein and mounted in this bore are two pilot operated check valves as illustrated in FIGS. 1 through 5. In this FIG. 6, one of the pilot operated check valves has been indicated by the reference numeral 20 and the second one has been indicated by the reference numeral 120. They are identical in structure and in function. The manifold body 88 is provided with two valve ports 90 and 91, as well as two cylinder ports 92 and 93. The cylinder 95 is provided with a piston 96 and there is also provided a pressure pump 98 and a valve 99. Assuming that one wishes to move the piston 96 located in cylinder 95 to the left as shown in FIG. 6, it is necessary to shift the valve 99 to the right as seen in FIG. 6 so as to directly connect the output of pump 98 to valve port 90. Pressurized fluid passes through the valve member 49 of pilot operated check valve 20 easily because all that need be overcome is the pressure of spring 71 and fluid under pressure then passes through cylinder port 92 into the right end of cylinder 95. The piston 96 is prevented from moving to the left because valve member 49 in pilot operated check valve 120 is still closed. As pressure builds up at valve port 90, this pressure is caused to flow into fluid chamber 62 in check valve 20 through opening 68 and acts upon the right side of control piston 52 of valve 20 which physically engages the control piston 52 of valve 120 causing it to move to the left which opens the valve member 49 of valve 120. When this valve has thus been opened fluid may flow from cylinder port 93 to valve port 91 back through the valve 99 to sump 101.

It will be noted in the above described operation that as fluid pressure builds up in valve port 90 the valve guide 58 in valve 20 will easily move away from engagement with its stopshoulder 64, which causes ready transmission of fluid pressure to the right side of control piston 52 in valve 20. As the control piston 52 in valve 120 moves to the left, the valve guide 58 in valve 120 moves into engagement with its stop shoulder 64, thereby controlling the movement of the control piston 52 in valve 120 because the fluid trapped in fluid chamber 62 of valve 120 must flow through the fluid opening or passageway 68 in the valve guide. This combination provides for free flow into the fluid chamber 62 and a controlled flow out of the fluid chamber 62. This insures that the valve guide need not be locked in place which requires additional parts and additional manufacturing operations. In order to move the piston 96 in cylinder 95 in the opposite direction, opposite movement of the valve 99 is required, namely, the valve 99 must be moved to the left. In this case fluid from pump 98 travels through ports 91 and 93 to the left side of piston 96. Valve 49 in check valve 20 is moved open by control piston 52 in check valve 120 moving to the right as seen in FIG. 6. This permits pressure trapped in the line attached to the right side of cylinder 95 to be discharged to sump 101.

FIG. 7 illustrates the present invention as incorporated in a check valve of the free flow type. This structure is identical with the structure of FIG. 1 with the exception that the control piston 52 has been omitted and the fluid opening 68 has been enlarged and is identified in the showing by numeral 168. A source of fluid and flow from port 43 has been indicated by arrow 103 and flow from port 42 has been indicated by arrow 106. Flow may be from either one or both of the ports 42 and 43 with the decision left up to the user. It will be seen, however, that free flow is permitted from ports 42 and 43 to port 41 and the only force that need be overcome is that of spring 71. Flow from port 41 to ports 42 and 43 is prohibited.

It will, therefore, be apparent that the present invention has provided a cartridge type check valve system for either a pilot operated check valve system or a free flow check valve system which is self-contained or in other words is contained within a single housing which only requires that the final user of the valve provide a single bore or single cavity within the final structure where it is to reside. In devices presently known, it is necessary that an additional machining operation be undergone to provide an adequate housing for the control piston in addition to the valve. The present device is believed to provide an improved mechanical linkage between the valve member and control piston as well as an improved guide for this mechanical linkage. As pointed out, this improved guide, also functions to permit free flow of fluid into a chamber between the guide and the control piston and to provide controlled flow therefrom. In addition, there is provided herein a unique means of capturing or holding the synthetic sealing member which forms a port of the valve and valve seat assembly.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A pilot operated cartridge check valve including in combination a housing having first and second end portions and having internal wall means defining an opening, a valve seat formed on said internal wall means, a fluid port in said first end portion of said housing providing for the entrance of fluid to said opening, a valve member movable into and out of engagement with said valve seat to selectively prohibit and permit fluid flow through said opening at said valve seat, a control piston positioned in said second end portion of said housing, and movable between first and second positions, a valve stem connected to said valve member and extending axially to a position adjacent said control piston, a valve guide positioned in an intermediate portion of said housing and having a periphery located adjacent said internal wall means of said housing, said valve guide and said control piston defining a fluid chamber therebetween, a stop shoulder on said internal wall means, said valve guide engageable with said stop shoulder in a first position to limit movement of said valve guide in the direction of said valve seat and said valve guide movable away from said stop shoulder to a second position toward said control piston, a central opening in said valve guide, said valve stem slidably extending through said central opening, a fluid opening in said valve guide providing for fluid communication between said fluid chamber and said axial opening at said first end portion of said housing, said valve guide in said first position permitting flow from said fluid chamber only through said fluid opening and in said second position permitting free flow around said valve guide to said fluid chamber, and a spring member acting on said valve member and said valve guide tending to move said valve member into engagement with said valve seat and said valve guide into engagement with said stop shoulder.

2. A valve as claimed in claim 1, wherein said valve stem adjacent said control piston comprises a head portion threadably connected to said valve stem which head portion slidably resides in a counterbore in said control piston.

3. A valve as claimed in claim 1, wherein said valve member comprises said stem connected to an enlarged head portion, a sealing member surrounding said stem and engaging said enlarged head portion, a generally cup-shaped retainer having a smaller diameter portion secured to said stem and having a larger diameter portion engaging said sealing member to hold the same in position.

4. A valve as claimed in claim 3, wherein first and second spaced sealing grooves are provided in the exterior of said housing and sealing members reside therein.

5. A valve including in combination a housing member having first and second end portions, wall means defining an opening in said housing, a valve seat in said first end portion of said housing, a control piston in said second end portion of said housing and movable back and forth therein, a fluid port in said housing providing for fluid flow into and out of said opening in said housing, a valve member movable between open and closed positions relative to said valve seat, mechanical connection means cooperating between said valve member and said control piston whereby movement of said control piston in a given direction causes opening of said valve member, means constantly urging said valve member to closed position, a valve guide slidably positioned in said opening for movement between first and second position, said valve guide forming a fluid chamber with said control piston, stop means limiting movement of said valve guide in the direction of said valve seat and determining said first position of said valve guide and a fluid passage through said valve guide providing for fluid communication from said fluid chamber to said opening in said first position of said valve guide.

6. A valve including in combination a single unitary housing member having first and second end portions, wall means defining an opening in said housing, a valve seat in said first end portion of said housing, a control piston in said second end portion of said housing and movable back and forth therein, a fluid port in said housing providing for fluid flow into and out of said opening in said housing at said first end portion, a valve member movable between open and closed positions relative to said valve seat, mechanical connection means cooperating between said valve member and said control piston whereby movement of said control piston in a given direction causes opening of said valve member, means constantly urging said valve member to closed position, a valve guide slidably positioned in said opening and forming a fluid chamber with said control piston, stop means engaging and limiting movement of said valve guide in a first position in the direction of said valve seat, a fluid passage through said valve guide providing for fluid communication from said fluid chamber to said opening in said first position of said valve guide, said valve guide being movable to a second position toward said control piston to permit free flow to said fluid chamber.

7. A valve assembly including a body having a bore therein, first and second valves as claimed in claim 6, positioned in said bore in back to back relationship with each other with said control pistons adjacent each other, first and second valve ports in said body in fluid communication, respectively, with said fluid ports of said valves, first and second cylinder ports in said body in fluid communication, respectively, with said valve members of said valves.

8. A valve as claimed in claim 6, wherein said mechanical connection means comprises a stem which is slidably received in a bore which extends axially through said valve guide.

9. A valve as claimed in claim 8, wherein said means which constantly urges said valve member to closed position comprises a spring which, also, engages said valve guide to urge same into engagement with said stop means.

10. A valve as claimed in claim 8, wherein said valve stem adjacent said control piston comprises a head portion threadably connected to said valve stem which head portion slidably resides in a counterbore in said control piston.

11. A valve as claimed in claim 6, wherein said valve member comprises a stem connected to an enlarged head portion, a sealing member surrounding said stem and engaging said enlarged head portion, a generally cup-shaped retainer having a smaller diameter portion secured to said stem and having a larger diameter portion engaging said sealing member to hold the same in position.

12. A valve as claimed in claim 11, wherein first and second spaced sealing grooves are provided in the exterior of said housing and sealing members reside therein.

* * * * *